United States Patent [19]
Jubin

[11] Patent Number: 5,894,914
[45] Date of Patent: Apr. 20, 1999

[54] ASSEMBLY COMPRISING AT LEAST TWO SEPARATE PORTIONS, SUCH AS A SUITCASE WITH LID, A VEHICLE WITH DOORS OR THE LIKE

[75] Inventor: Jean-Jacques R. Jubin, Le Grand-Quevilly, France

[73] Assignee: Jubinov Société Civile, Seine Maritime, France

[21] Appl. No.: 08/564,108

[22] PCT Filed: Jun. 16, 1994

[86] PCT No.: PCT/FR94/00725

§ 371 Date: Apr. 22, 1996

§ 102(e) Date: Apr. 22, 1996

[87] PCT Pub. No.: WO94/28757

PCT Pub. Date: Dec. 22, 1994

[30] Foreign Application Priority Data

Jun. 16, 1993 [FR] France .................. 93 07246

[51] Int. Cl.$^6$ .............. A45C 5/04; B65D 43/16; B62D 25/10
[52] U.S. Cl. .............. 190/119; 190/28; 190/122; 190/125; 150/119; 220/213
[58] Field of Search .............. 190/28, 100, 119–121, 190/24.1; 206/524.8; D3/279, 322, 323, 236, 294, 292; 150/119; 220/213

[56] References Cited

U.S. PATENT DOCUMENTS

| 99,284 | 2/1870 | Bond | 190/24 |
|---|---|---|---|
| D. 282,303 | 1/1986 | Jessen | D3/279 X |
| 298,146 | 5/1884 | Wilson | 190/28 |
| 1,713,558 | 5/1929 | Schollheyer | 206/524.8 |
| 3,292,749 | 12/1966 | Reading | 190/119 |
| 3,544,418 | 12/1970 | Holtzman | 190/121 X |
| 3,564,146 | 2/1971 | Arnolds | 220/4 X |
| 4,172,657 | 10/1979 | Myers et al. | 190/28 |
| 4,369,883 | 1/1983 | Stravitz | 220/343 X |
| 4,465,189 | 8/1984 | Molzan | 206/524.8 |
| 5,111,920 | 5/1992 | Castelli et al. | 190/100 X |
| 5,257,509 | 11/1993 | Harris | 190/1 X |

FOREIGN PATENT DOCUMENTS

| 148742 | 2/1937 | Austria | 190/28 |
|---|---|---|---|
| 2388973 | 11/1978 | France . | |
| 2397334 | 2/1979 | France . | |
| 2518498 | 6/1983 | France . | |
| 1046293 | 12/1958 | Germany . | |
| 1486241 | 5/1969 | Germany . | |
| 2816045 | 10/1979 | Germany | 190/100 |
| 2942741 | 5/1981 | Germany . | |
| 3023172 | 1/1982 | Germany | 190/100 |
| 557535 | 2/1957 | Italy | 190/100 |
| 1253853 | 11/1971 | United Kingdom | 190/121 |

*Primary Examiner*—Sue A. Weaver
*Attorney, Agent, or Firm*—Notaro & Michalos P.C.

[57] ABSTRACT

A suitcase, lid or door has a first polygonal part and a second polygonal part. The first and second parts are engaged against each other in a closed position for the assembly. The first and second parts each having at least two non-parallel sides connected to each other at a corner and extending at an angle to each other. Each side has a rabbet edge and the rabbet edges of the first part are shaped to closely engage the rabbet edges of the second part in the closed position. The edges of each side have a gently undulating profile with at least one arc on each side, one of the parts having convex arcs which correspond to, and closely engage concave arcs of the other part. The corners are rounded and one of the concave arcs extends around each corner.

34 Claims, 7 Drawing Sheets

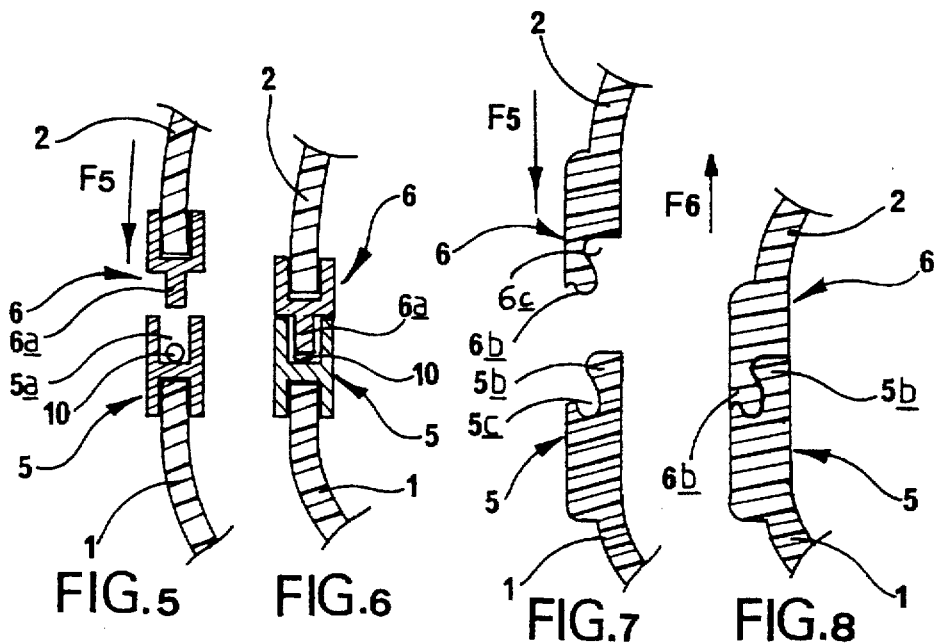
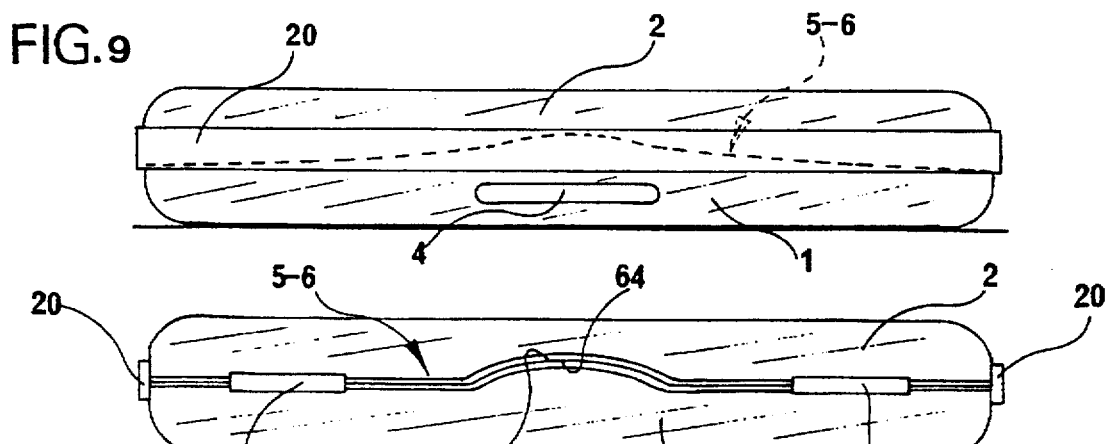
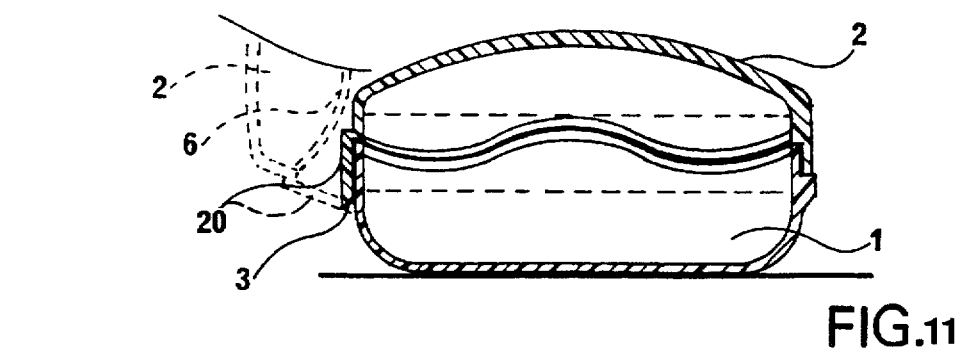

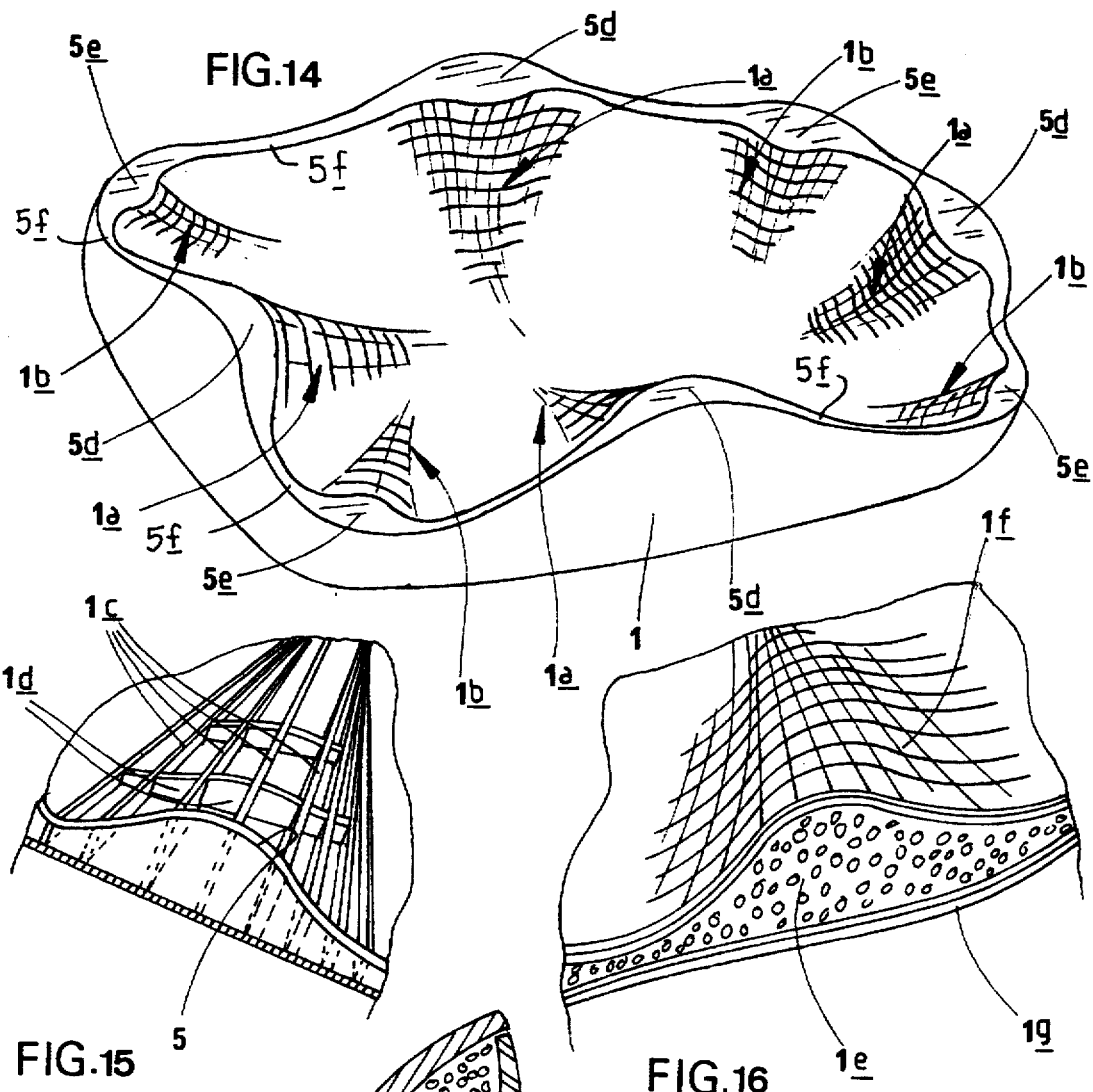
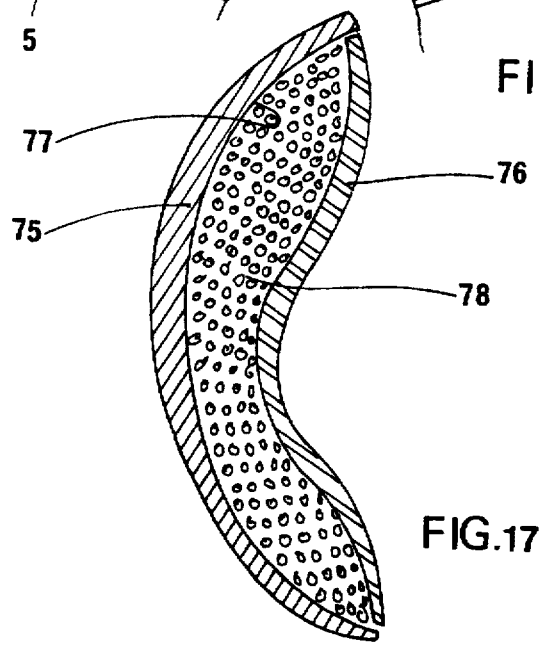
FIG.14
FIG.15
FIG.16
FIG.17

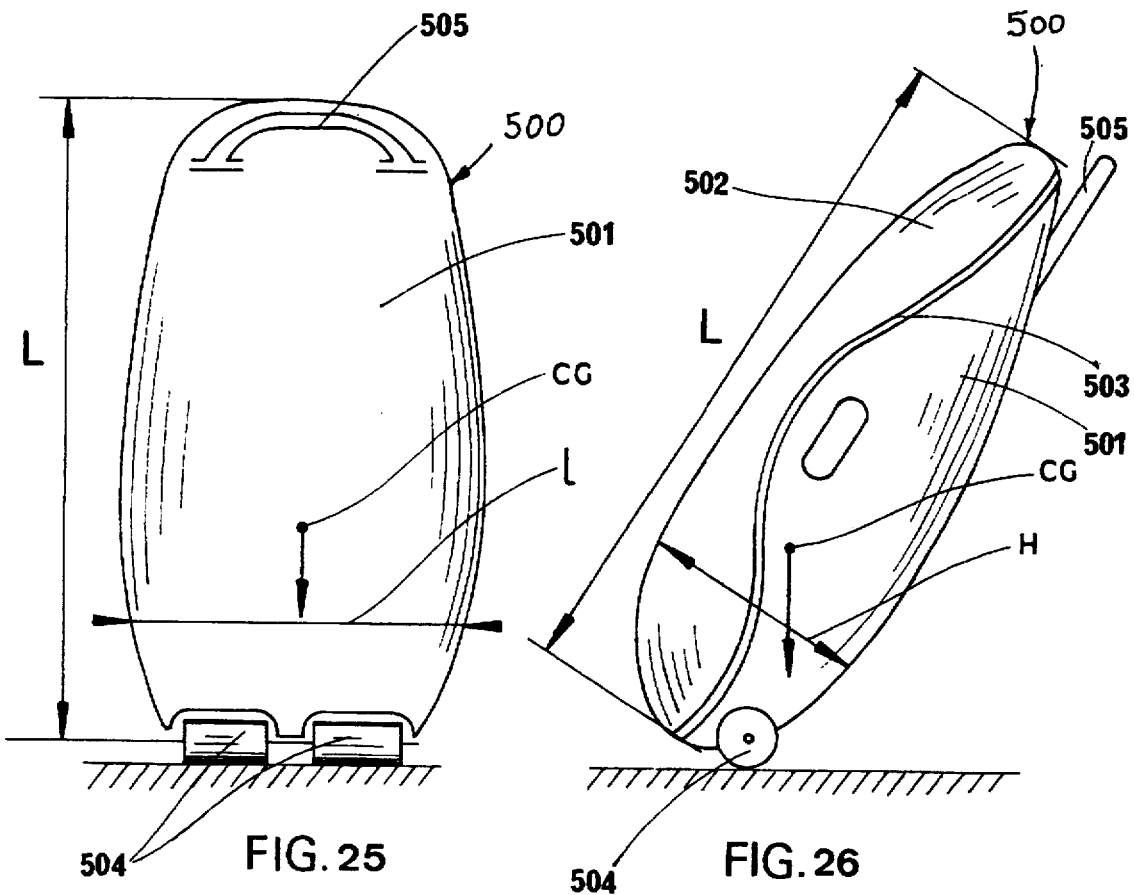
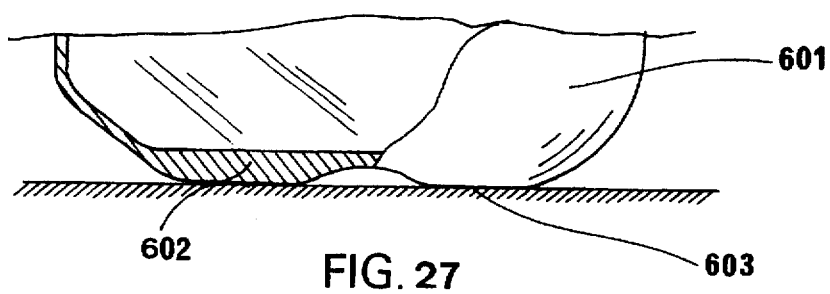

5,894,914

ASSEMBLY COMPRISING AT LEAST TWO SEPARATE PORTIONS, SUCH AS A SUITCASE WITH LID, A VEHICLE WITH DOORS OR THE LIKE

FIELD AND BACKGROUND OF THE INVENTION

The present invention concerns an assembly comprising at least two parts that are moveable in relation to each other: a building with at least one door, a vehicle with doors, a boot and a bonnet, a container such as a trunk, suitcase, bag, etc.

It can also cover casings requiring high-quality closure: photographic, cinematic, video and other cameras. In a fairly elaborate version, it may cover sealed doors, security lock chambers, and the like.

Indeed, whatever the application, the invention allows two parts that are moveable in respect of each other, particularly hinged, to be connected in an extremely sturdy manner, so as to withstand the stresses imposed on these parts, systematically or occasionally, by the use of the assembly.

It is known in particular that luggage is often subject to impacts during handling in travel: it can fall (sometimes from quite high) or receive relatively violent impacts at the time of collisions between rail carriages, on aircraft landing, etc.

Impacts often have the effect of placing a stress on the two moveable parts, the body of the article of luggage and its lid, so as to separate them.

Since these two parts cooperate, in the closed position, by contact between rabbets, the latter are very resistant to perpendicular impact but the two parts are only held in the closed position by added mechanical elements that are independent of the rabbets themselves.

In general these elements comprise at least one pivoting part that has to cooperate with a fixed part, similar to the bolt of a lock in its keeper.

In other words, however strong the two parts are, they cannot withstand an opening effort other than through the mechanical parts connecting them.

For this reason, manufacturers have concentrated their efforts on these mechanical elements since it is easy to solve the problem of the sturdiness of the assembly itself.

For instance, articles of luggage are now made of very strong synthetic materials, shaped as two shells edged with metallic rabbets, and it is known that such luggage is capable of resisting very high pressure without the risk of crushing.

Some articles of luggage have a very comprehensive metal structure that makes the assembly even more rigid and strong.

But even these articles of luggage can open under the effect of a very low stress if they are fitted with rudimentary locks.

To specify the state of the art, we can cite:

patent specification FR-A-2.388.973, which describes a solution to the problem of a door or similar being forced by means of a tool inserted into a gap between two parts that are moveable in relation to each other, with a view to exerting a lever effect.

This solution consists of providing, between the two moveable parts, zigzag surfaces, that is, surfaces formed of teeth that are very numerous, very sloping (at least 45°) and very close together so that there is no rectilinear part between two successive teeth that would allow a tool to be inserted and used as a lever so as to force apart the two moveable parts.

In this way, " . . . Owing to such a slope, even if a malicious person manages to insert any kind of tool into the gap separating the two moveable parts, the force he can exert with this tool does not produce a component tending to separate the two moveable parts." (Page 2, lines 31 to 35.)

The solution described in that document therefore concerns a problem that is quite different from that solved by the present invention.

SUMMARY OF THE INVENTION

Indeed, the present invention does not seek to prevent forcible opening but to resist relative movement between the two moveable parts, except exactly in the normal direction of separation, which is the same as in forcible opening.

In other words, an object produced in accordance with the invention can be forced by means of a tool constituting a lever since the parts in contact are large curves which, in this respect, are equivalent to conventional straight lines.

On the other hand, however, the large curves of an article in accordance with the invention offer considerable resistance to any violent effort coming from outside against any one of the moveable parts, which is not covered in any way by the document FR-A-2.388.973.

On the contrary, the numerous small teeth that interpenetrate into each other would be powerless to create any resistance to a violent effort, since it may be feared that such an effort would have the result of suddenly offsetting the teeth by at least one row, which would lock the two moveable parts in an unacceptable random position.

The present invention offers an absolutely novel solution to this problem by causing the rabbets themselves to play a reinforcement role which confines the mechanical elements to a single function: that of holding the two parts exclusively in the sense of their normal opening.

Abnormal stresses coming from outside: impacts, falls, etc. are taken by the rabbets, which are designed so as to resist considerable forces by playing a dual role: in the direction of sliding the interpenetrating rabbets behave like an oyster on which an attempt is made to slide the lid from the body; in the direction of crushing of the parts perpendicular to the rabbets, these behave like a vault, the extreme strength of which, compared with a straight wall, is well known.

To this end, the subject-matter of the invention is an assembly such as a building, a vehicle, a container and the like, comprising at least two distinct parts having complementary and opposing rabbets, located facing each other and intended to cooperate with one another, characterised in that there are at least two rabbets on each part, that said rabbets are offset angularly and have a gently undulating profile having, for each rabbet, at least one portion curved in a convex arc on one of the two parts and at least one portion curved in a concave arc on the other, so that each convex arc is engaged in a concave arc of the opposite rabbet when the two parts are applied against each other.

According to other characteristics of the invention:

the arc of the curves has a deflection of a length less than the corresponding chord;

the arc of the curves has a deflection of a length comprised between $1/100$ and $1/4$ of the length of the corresponding chord;

if the assembly has a length L, a width I and a third dimension, height or thickness, H, then the height of the deflection of the arc of the curves is of the order of magnitude of ⅔ of H;

the two distinct parts are moveable in relation to one another between a position known as "open" in which there is a passage between the two parts and a position known as "closed" in which the two parts are applied against one another, blocking the passage, when the two parts are in a closed position;

the parts have a polygonal contour and have rabbets on at least two nonparallel sides of their contour;

the parts have a quadrangular contour;

the parts have rabbets on all four sides;

the two parts are hinged together along an axis of pivoting;

the axis of pivoting is close to one of the sides of the parts;

the parts have rabbets on that one of their sides that is the closest to the axis of hinging;

the moveable parts have to cooperate edge to edge, the portions shaped as a convex and concave curved arc being located in a line substantially perpendicular to the plane of the moveable parts proper;

the moveable parts have to be located in the closed position, in planes that are substantially an extension of one another, such that the edges are themselves in the extension of said moveable parts and the portions shaped as a convex and concave curved arc in the extension of said edges;

the rabbets have rims that are offset in twos and have to be positioned against one another when the two parts are in the closed position;

a flexible seal is secured to one of the rabbets facing the opposite rabbet;

the assembly comprises means intended to make a tight closure of the two parts, at right angles to the rabbets, said rabbets delimiting a space located between the two parts when they are in the closed position, which space is connected to an air suction device;

one of the two parts at least has struts that have to cooperate with the other part, in the closed position;

the two parts have struts, those of the one part having to be placed against those of the other part, in the closed position;

the two distinct parts are joined together so as to be made inseparable and to form a single structure constituted by two shells;

the shells define an internal space;

the internal space contains struts between the shells;

the internal space contains a filling material;

the assembly has the general shape of a roller;

at least one of the distinct parts has a convex outer face, in the shape of a dome with a very flat curve forming a vault;

the part that has a convex outer face, in the shape of a dome with a very flat curve, has a polygonal contour, each vertex of the polygon being itself curved and convex, being connected to lateral faces that are substantially orthogonal to the convex outer face;

each vertex of the polygon is a fraction of a sphere;

the two distinct parts are asymmetrical;

the rabbets are variable in width;

the assembly having a polygonal contour, the greatest width of the rabbets is in the vicinity of the vertices of the polygon and/or in the central zone of its sides;

the greatest width of the rabbets is at the vertex of the respectively convex and concave arcs;

at least one of the parts is made of a material that is variable in thickness;

at least one of the two parts has reinforcing ribs;

the reinforcing ribs are hollow;

the reinforcing ribs contain a filling material such as a synthetic foam which may if appropriate be strengthened, a cellular network or similar;

the assembly consists of a container such as an article of luggage, a recipient or similar and has, externally, sliding elements such as runners, preferably produced in a piece with the assembly proper.

It will be easier to understand the invention from the detailed description given below with reference to the attached drawing. Naturally, the description and the drawing are given merely by way of indicative and non-exhaustive example.

BRIEF DESCRIPTION OF THE DRAWINGS

FIG. 5 is a partial diagrammatic view in section along the line 5—5 in FIG. 4 and showing a particular embodiment of the rabbets, when the suitcase is in the halfopen position.

FIG. 6 is a diagrammatic view similar to that in FIG. 5, showing the interpenetrating rabbets when the suitcase is in the closed position.

FIG. 7 is a partial diagrammatic view in section showing another embodiment of the rabbets, when the suitcase is in the half-open position.

FIG. 8 is a diagrammatic view similar to that in FIG. 7, showing the interpenetrating rabbets when the suitcase is in the closed position.

FIG. 9 is a diagrammatic front view of a suitcase produced in accordance with the invention, the rabbets of which are concealed.

FIG. 10 is a diagrammatic view of the suitcase in FIG. 9, seen from the side of a hinge connecting the two parts of the suitcase, the body and the lid.

FIG. 11 is a diagrammatic view in cross section of a suitcase in accordance with the invention, showing a particular embodiment of a hinge connecting the two parts of the suitcase, the body and the lid.

FIG. 14 is a diagrammatic view of part of an assembly in accordance with the invention, showing certain additional characteristics.

FIG. 15 is a partial diagrammatic view showing stiffening ribs of the compartmentalised type.

FIG. 16 is a partial diagrammatic view showing stiffening ribs of the sandwich type.

FIG. 17 is a diagrammatic view in cross section of an assembly in accordance with the invention, composed of two integral shells.

FIG. 25 shows diagrammatically a suitcase in accordance with the invention, having the general form of an asymmetrical roller.

FIG. 26 shows the suitcase in FIG. 25 during transport by wheeling.

FIG. 27 is a partial diagrammatic view of an assembly in accordance with the invention, provided with sliding runners.

DESCRIPTION OF THE PREFERRED EMBODIMENTS

Figure 1:
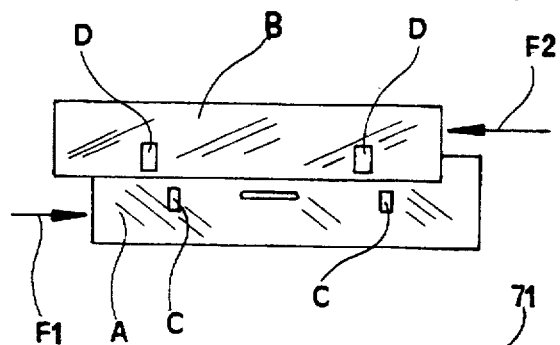
FIG. 1 is a diagram illustrating the deformability of assemblies of the known art.

The conventional state of the art is illustrated by the diagram in FIG. 1, which shows a suitcase seen from the front, when it is subjected to an external force (for example an accidental fall) having the result of a sideways relative movement of the body A and the lid B. This is symbolised by the arrows F1 and F2.

Resistance to such a force depends in essence on that of the closing elements C–D since the rims (not shown in detail and well known) are manifestly inadequate.

The consequence of these structural weaknesses is that the suitcase opens inopportunely, the closing elements C–D giving way or breaking, and the rims separating.

Figure 2:
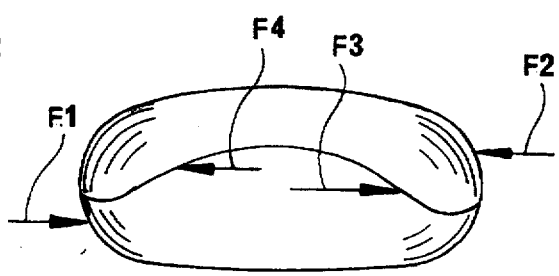
FIG. 2 is a diagram illustrating the principle of the non-deformability of an assembly in accordance with the invention.

Looking now at FIG. 2, a suitcase equivalent to that in FIG. 1 but produced in accordance with the invention will be seen.

When such a suitcase is subjected to the same external force, the efforts in the directions F1 and F2 are reflected in the direction of the arrow F3 and the arrow F4 respectively onto the central curved rabbet and, unless a colossal force is developed that would cause the suitcase to burst by destroying its walls, the interpenetrating parts of the curved rabbets are radically opposed to any sideways relative movement.

For a suitcase in accordance with the invention, the closing elements serve only to keep the body and the lid together, and play only a very small part in the resistance to external stresses.

Referring now to FIGS. 3 to 6, we can see an embodiment of the invention applied to the constitution of a suitcase of the known type comprising a body 1 and a lid 2, joined by a hinge 3, the body 1 being provided with a grasping handle 4.

The parts intended to cooperate with each other are, here, moveable.

The body 1 and the lid 2 are concave since, by nature, the suitcase has to contain various articles, such that they cooperate edge to edge over their periphery by means of interpenetrating rabbets, as will be described in detail later on.

The suitcase has a fairly conventional rectangular contour and comprises a continuous rabbet 5 that extends over all four sides of the body 1 and its counterpart 6 which extends over all four sides of the lid 2.

The rabbets 5 and 6 have an undulating profile giving the rabbet 5 of the body 1 four parts curved in a convex arc 51, 52, 53 and 54, and four corner parts curved in a concave arc 55, 56, 57 and 58, which correspond respectively to four concave parts 61, 62, 63 and 64 and four convex parts 65, 66, 67 and 68 of the rabbet 6 of the lid 2.

If the bottom 70 of the body 1 and the bottom 71 of the lid 2 are compared to a plane, this term being taken in its widest acceptance (and not as a strict geometric definition), it will be noted that the convex portions and concave portions are substantially in perpendicular alignment with these planes since, here, the body 1 and the lid 2 cooperate edge to edge, in the same way as a jaw.

Figure 3:
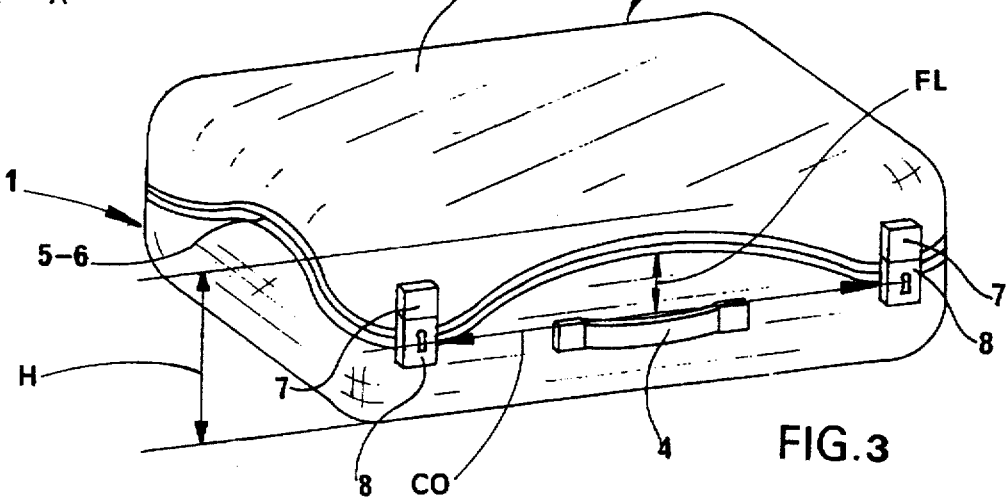
FIG. 3 is a diagrammatic view in perspective of a suitcase made in accordance with the invention, shown in the closed position.

In the closed position shown in FIG. 3, the rabbets 5 and 6 cooperate intimately, whatever the chosen system of interpenetration, and the curves of the undulating profile that are located in substantially vertical planes (when considering FIGS. 3 and 4), energetically withstand all sideways displacements between the body 1 and the lid 2, whatever constraints the suitcase may be subjected to.

The important thing is to prevent sideways movements, that is, those that have a horizontal result (when considering FIGS. 3 and 4) which, from a strictly geometrical point of view, amounts to considering both dimensions of a single plane.

Providing rabbets on two sides only could therefore be sufficient, the important thing being, when all is said and done, that at least two rabbets are angularly offset, preferably but not exclusively by 90°.

These considerations are of varying significance according to the applications.

Figure 4:
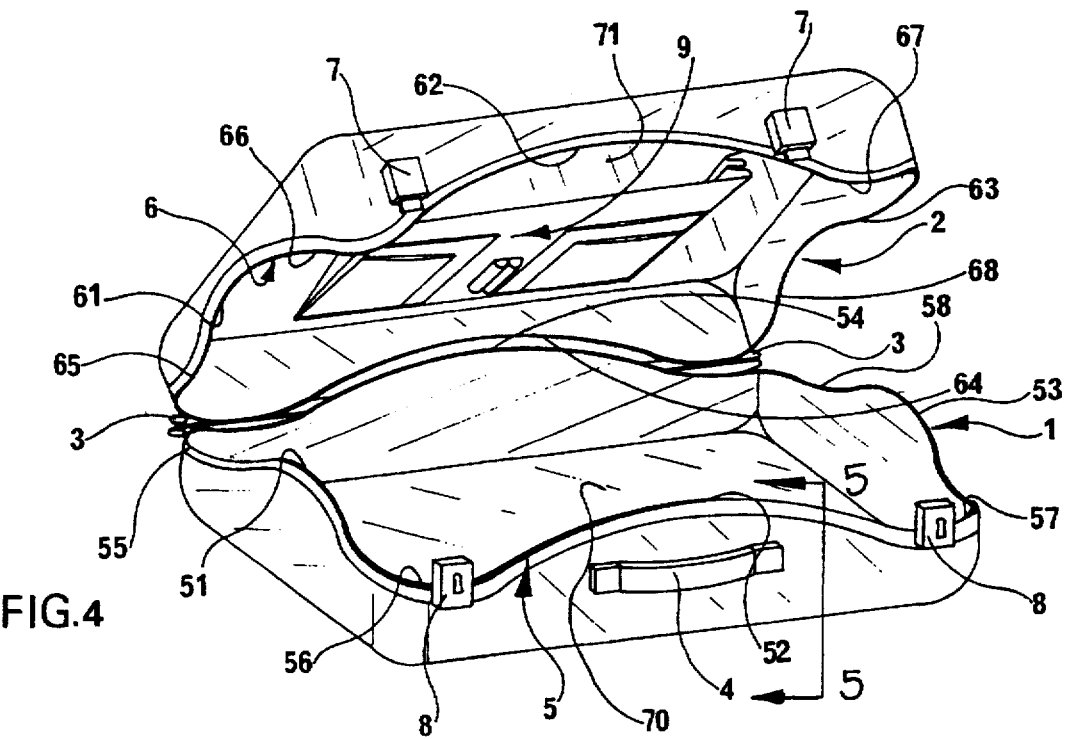
FIG. 4 is a diagrammatic view in perspective of the suitcase in FIG. 3, shown in the open position.

It will be understood, with the example of the suitcase in FIGS. 3 and 4, that the invention makes it possible to produce an extremely effective closure, as good as the interlocking of an oyster and its lid.

This produces an important advantage: since all possibility of sideways relative movement between the two parts is eliminated (body 1 and lid 2 in the case of the suitcase in FIGS. 3 and 4), it becomes possible to join them together by much simpler means than those used at present since they are now subject to stress only in the direction of the separation of the two parts and not also in the two directions of the horizontal plane (when considering FIGS. 3 and 4) and in the four directions, in twos, opposite each of these two directions.

FIGS. 3 and 4 show two pairs of elements 7 and 8 surface-mounted near the corners of the suitcase but any other solution can of course be adopted.

The undulating profile does not in any way affect the normal functions of the suitcase, which can be provided with various traditional accessories such as storage pockets 9 which have been shown on the inside of the lid 2 (FIG. 4).

On the other hand, the invention allows other aesthetic variations by using a reduction or an enhancement of the visual effect produced by the rabbets with undulating profile 5 and 6.

In this respect, a larger or smaller number of undulations can be provided in the rabbets 5 and 6, while it is known that, from the utilitarian point of view, as indicated above, it is sufficient to provide curved rabbets on two non-parallel sides, each of them being formed by two convex/concave counterparts.

On one side, therefore, a convex part surrounded by two concave parts is sufficient, and these have to cooperate with a concave part surrounded by two convex parts.

It can be seen in FIGS. 3 and 4 that the suitcase has rounded corners, so that the concave parts 55, 56, 57 and 58 on the body 1, and the convex parts 65, 66, 67 and 68 of the lid 2 extend over two sides at once but this is just one particular embodiment, which can be replaced by another quite different one that would provide marked, even acute, angles, the rabbets being distinctly located on the sides proper.

However, for reasons of resistance to external stresses, it is preferable for the vertices of the polygon (here the four corners of a rectangle) to be rounded, convex and connected to both adjacent faces in order to obtain a vault effect.

These rounded corners can have a curvature of varying complexity and can also be a fraction of a sphere.

FIGS. 5 and 6 show an example of rabbets in which the rabbet 5 has an H-shaped section having a groove 5a while the rabbet 6 has an tongue 6a, the dimensions of which are coordinated with those of the groove 5a.

The rabbets 5 and 6, made of metal for example, are secured to the body 1 and to the lid 2 by crimping, gluing or any other known means. When the lid 2 is lowered towards the body 1 in the direction of the arrow F5 in order to close the suitcase, the lid 2 pivots around the hinge 3 and the tongue 6a of the rabbet 6 penetrates into the groove 5a (FIG. 6), which corresponds to the closed position.

The imprisoning of the tongue 6a in the groove 5a prevents any sideways movement localized between the rabbets 5 and 6, which movement could, for example, result from a fraudulent attempt at breaking open aimed at opening the suitcase by force, if it has not been possible to operate the elements 7–8 locked by the legitimate owner.

To obtain a tight closure, a resilient seal 10 is provided, bonded to the base of the groove 5a.

FIGS. 7 and 8 show another type of rabbet, in which the rabbet 5 and the rabbet 6 are made as one piece with the body 1 and the lid 2. These rabbets 5 and 6 have offset rims respectively 5b and 6b defining notches, also offset, 5c and 6c with complementary sections, the rim 6b having forms and dimensions corresponding to those of the notch 5c.

When the lid 2 is lowered towards the body 1 in the direction of the arrow F5 so as to close the suitcase, the lid 2 pivots about the hinge 3 and the rim 6b of the rabbet 6 is positioned in the notch 5c of the rabbet 5 and, symmetrically, the rim 5b of the rabbet 5 is positioned in the notch 6c of the rabbet 6 (FIG. 8), which corresponds to the closed position.

When the suitcase is closed, the rim 6b is positioned in the notch 5c by elastic deformation of the constituent material.

When the suitcase is opened, the rim 6b is extracted from the notch 5c, also by elastic deformation, which presupposes that an effort is deployed in the direction of the arrow F6, which effort can be applied to an element forming a fulcrum (not shown) such as a relief, a ring, etc.

To obtain a tight closure, a resilient seal can be provided, located at the bottom of the notches 5c and 6c.

FIGS. 9 and 10 illustrate an embodiment of a suitcase in which, as mentioned above, the visual effect of the undulating profile of the rabbets 5 and 6 is reduced.

The body 1 (or the lid 2) is integral with a strip 20 with rectilinear edges, surface-mounted in front of the curved line of the rabbets 5 and 6 so as to mask both of them when the suitcase is in the closed position.

The strip 20 is visible on the "front" face of the suitcase, in the position where the grasping handle 4 is located, and on the sides.

From the aesthetic point of view, this gives the suitcase a traditional appearance and, from the utilitarian point of view, greater security, because the rabbets 5 and 6 are made practically inaccessible since they can be reached only by destroying the strip 20.

This strip 20 can be produced in a particularly sturdy manner if it is a constituent part of a one-piece metal carcase (not shown) that serves as a rigid structure for the suitcase as a whole, as is known in itself.

FIG. 10 shows the "rear" part of the suitcase, where the hinge 3 is located, this being in two parts in this case.

Clearly, if the strip 20 leaves the rear part of the suitcase apparent, the security obtained is mediocre since the rabbets 5 and 6 are directly exposed and accessible.

But on the other hand the hinge (or hinges) 3 is a very effective strengthening element that can offer strong resistance to attempts at forcible opening consisting of inserting a tool between the rabbets 5 and 6 with a view to separating them by acting as a lever.

This strengthening effect is more effective when the axis of the hinge is well protected and inaccessible.

The presence of the parts 54 and 64 at the rear the suitcase may not be essential, as long as the front part does indeed have rabbets 5–6 with an undulating profile since they can be sufficient to withstand efforts applied laterally in a direction corresponding to a lengthwise relative sliding of the body 1 and the lid 2.

In this case, the hinge 3 can be shifted downwards and the strip 20 can be provided above it, as shown in FIG. 11.

Of course, the invention is not limited to the manufacture of articles of luggage such as suitcases.

Figure 12:
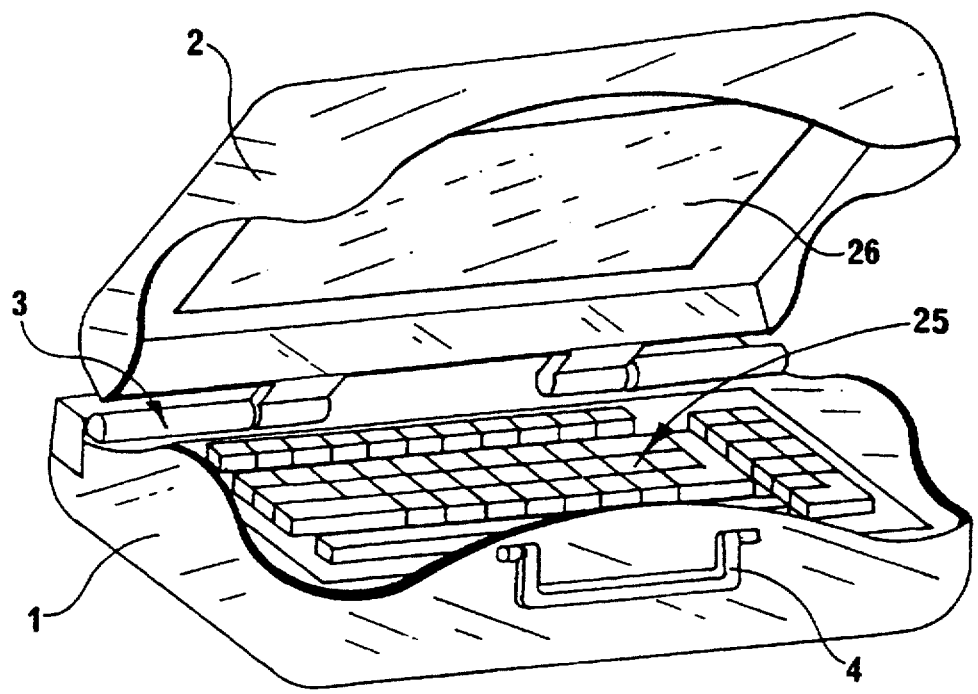
FIG. 12 is a diagrammatic view in perspective showing the application of the invention to a portable computer.

For instance, the invention makes it possible to produce cases designed especially for certain piece of equipment: FIG. 12 shows a portable computer in which the controls 25 are in the body 1 and the screen 26 in the lid 2, the hinge 3 being of the type allowing the transfer of instructions and information from the controls 25 to the screen 26.

Figure 13:
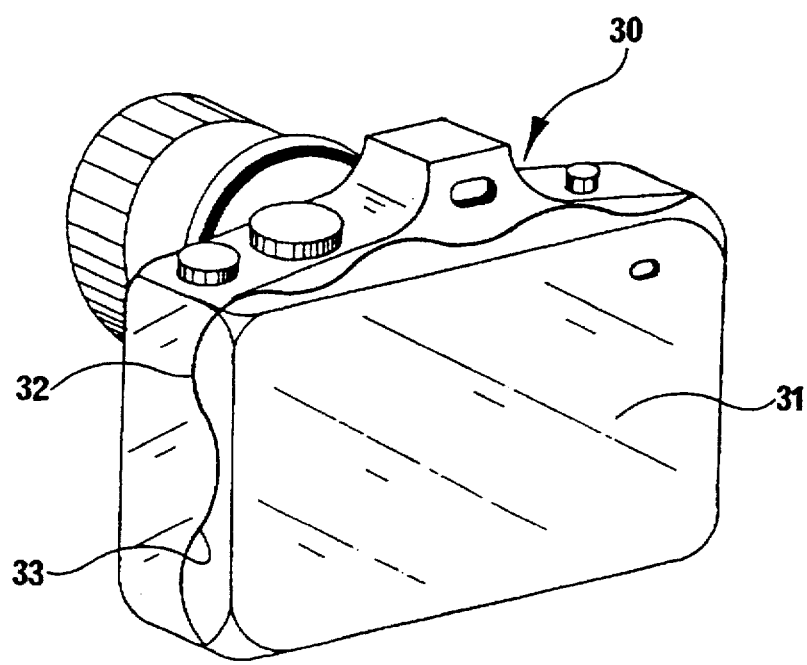
FIG. 13 is a diagrammatic view in perspective showing the application of the invention to a photographic camera.

FIG. 13 shows a photographic camera comprising a body 30 containing all the required elements and a compartment designed for receiving sensitive films, closed off by a door 31.

The body 30 and the door 31 have rabbets 32–33 with an undulating profile of the same type as that described in relation to FIGS. 2 to 8 and which will therefore not be described in detail.

The rabbets 32 and 33 can have varied sections, different from or the same as those in FIGS. 5 to 8, depending on the specific requirements of that application, particularly with regard to light-proofing, these arrangements being within the scope of the person skilled in the art.

It will be understood that the very great strength contributed by the invention to any assembly comprising moveable parts is particularly appreciable for delicate apparatus that is also readily exposed to impacts, which is exactly the case with optical and electronic equipment such as photographic, cinematic and video cameras, radio transmission equipment, medical and surgical equipment, etc.

An application of the invention that is of particular interest concerns vehicles.

In FIG. 3, it will be noted that the undulating profile of the rabbets is formed of successive inverted arcs but with a very low amplitude, that is, the deflection FL is distinctly less than the chord CO of the corresponding arc.

In practice, the deflection FL represents only a small fraction of the chord CO.

In FIG. 3 the deflection is equal to around ½ of the chord CO but it is conceivable that this proportion could fall to ⅟100.

On the small sides of the suitcase, the amplitude of the curve is slightly more marked and is of the order of ¼.

In all cases, what is being sought is a vault effect since, naturally, the intention is also to give the suitcase great resistance to "vertical" crushing.

It is therefore a characteristic of the invention to have a small number of arcs on each side of the suitcase, or even just one as shown in FIGS. 2 to 12. In FIGS. 2 to 4 each side of the suitcase has just one central arc placed between two shorter arcs located at the corners and extending in a curve so as to connect the front and side faces.

The large sides of the housing of the device shown in FIG. 13 each have two arcs in one direction and three in the other.

In relation to the height H, the height of the deflection FL is around ⅔ but this is not an unvarying condition, and the invention allows numerous variations in this field.

With reference to FIG. 14, this shows just one part of an assembly in accordance with the invention, to make it easier to understand the drawing.

This could, in particular, be the body 1 of a suitcase and it can be seen that it has rabbets 5 of varying width.

The wider parts are at the vertices of the convex and concave arcs, the wide parts 5d being at the middle of the four faces of the body 1 and the wide parts 5e, not necessarily equal to the parts 5d, at the angles of the body 1.

The narrow parts 5f are, of course, located between two wide parts 5d–5e and the assembly is harmoniously continuous.

It can be seen here that the body 1 has walls of variable thickness, since reinforcing ribs 1a are provided, connected to the wide parts 5d of the rabbets 5 and 1b, which connected to the wide parts 5e.

In this way an extremely strong body is produced, since the increased thicknesses of the ribs 1a and 1b are formed by a surplus of material judiciously located at the most exposed places.

In FIG. 14 it is assumed that the body 1 is moulded in a single piece, for example of composite material, such that the ribs 1a and 1b are solid.

Another solution may be preferred, for reasons of the price of materials or for reasons of weight.

FIG. 15 shows a variant in which a rib of type 1a or 1b is formed of several partitions 1c that diverge from a central zone of the body 1 towards a rabbet 5, here of constant width, and of transverse partitions 1d parallel to each other.

FIG. 16 shows a solution of the "sandwich" type in which a rib of type 1a or 1b is formed by a filling material 1e placed between two thicknesses of a composite material 1f and 1g.

The filling material 1e can be a synthetic foam, agglomerated globules, etc. or can be formed of an alveolar network, especially of honeycomb type.

The ribs can also be hollow and empty.

FIG. 17 shows a variant of the invention in which the two distinct parts are not moveable relative to each other.

Here, the resulting assembly is a structure composed of two shells 75 and 76 assembled by their peripheries and the shape of which defines an inner space 77.

It may be desirable to strengthen this structure in order to protect it against crushing and several solutions are possible:

The shells 75 and 76 can have struts on the face that is intended to be their inner face, which struts bear against either the inner face of the other shell or against the struts of the other shell.

It is also possible to fill the inner space 77 with an ad hoc material 78, as shown here.

Figure 18:
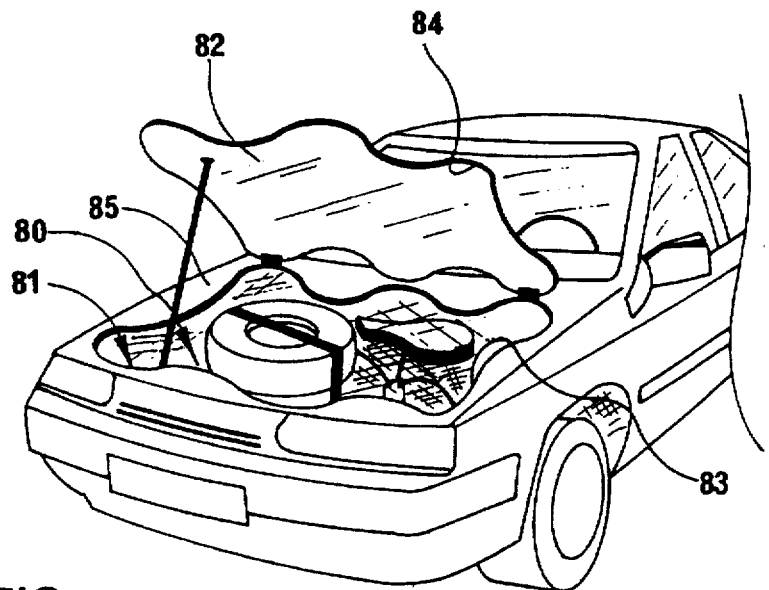
FIG. 18 is a partial diagrammatic view of a motor vehicle fitted with an engine compartment and a bonnet made in accordance with the invention.

FIG. 18 shows the front of a private vehicle having a driving apparatus 80 placed in a compartment 81 closed off by a bonnet 82.

The edges of the compartment 81 have a rabbet 83 with an undulating profile corresponding to that of a rabbet 84 provided on the periphery of the bonnet 82.

It can be seen here that the moveable parts constituted by the engine compartment 81 and by the bonnet 82 must not cooperate edge to edge since the bonnet 82 is substantially flat.

In the closed position the bonnet 82 is therefore positioned in a plane that is in the extension of the surround 85 of the engine compartment 81.

Here too, the word "plane" should be understood in the broadest acceptance of the term since, more often than not, the front of a vehicle has curved shapes and the assembly constituted by the surround 85 and the closed bonnet 82 constitutes a harmonious whole, meeting aesthetic and aerodynamic requirements.

The bonnet 82 must therefore be in a continuous line with the other parts of the bodywork and this is what it has been intended to express in outline form by characterising this particular structure of the invention by the notion of planes located in an extension of one another, whether they are flat or curved surfaces.

The edges of the bonnet 82 are themselves in the extension of the bonnet 82 proper and the concave and convex portions of the rabbets 84 are also in the extension of the bonnet 82.

This structure therefore differs from that described in relation to FIGS. 2 to 13, the concave and convex portions here not being located in an alignment perpendicular to the plane of the moveable parts but, on the contrary, flat, in the extension of the plane of each of these moveable parts.

In the closed position, the bonnet 82 seems to a certain extent to be flush-fitted in the surround 85.

It is known how exposed the front part of vehicles is to impacts and the invention is particularly effective for avoiding deformations arising from small or moderate impacts, since the bonnet 82 is made rigid by the compartment 81 and the compartment 81 is made rigid by the bonnet 82, because of the interpenetration of the rabbets 83 and 84.

Indeed, the convex and concave parts of the interpenetrating rabbets 83–84 brace themselves mutually and resisting relative movements between the compartment 81 and the bonnet 82, under the effect of accidental impacts which practically always occur in the direction parallel to the ground, that is, substantially in one plane.

Figure 19:
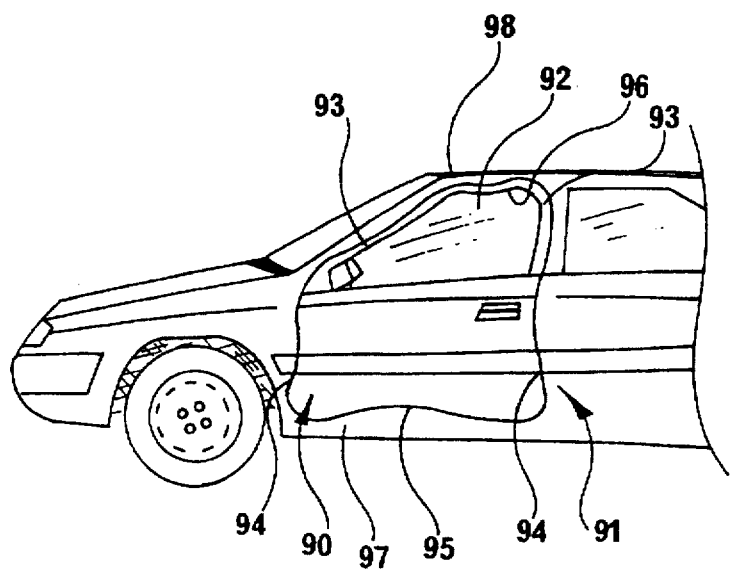
FIG. 19 is a partial diagrammatic view of a motor vehicle fitted with a passenger compartment and doors made in accordance with the invention.

FIG. 19 shows a private vehicle with an access door on either side, only the left-hand door 90 being visible in the drawing.

The usefulness of safety belts arises from the observation that the dangers of serious injury and death are considerably reduced if people are held inside a vehicle involved in an accident rather than being projected outside it.

In the case of violent impact in an accident, the doors often open and therefore deprive the passengers from protection that isolated them from the outside.

This inopportune opening is particularly to be feared when the closing elements (bolt and keeper) are in practice located at one point and offer very little resistance to forced opening since, under the effect of frontal impact, the door is deformed so as to "swell", which effect belongs to the "buckling" family.

The invention is therefore particularly useful for this application, and it is seen in FIG. 19 that the door 90 cooperates with the bodywork 91 through rabbets with an undulating profile that will not be described again since they are of the same type as in FIG. 18.

In this case there is a specific problem arising from the presence of a window 92 that must be capable of being lowered so as to be obscured inside the door 90, this affecting the shapes of the door 90.

Since the vertical edges of the window 92 are generally rectilinear this means that, in the raised position shown in FIG. 19, the edges of the opening must also be rectilinear.

For this, it is easy to combine rectilinear guides and door edges provided with undulating rabbets, since the rectilinear guides are within the contour of the door edges. However, this leads to the presence of solid areas 93 between the rectilinear guides and the undulating edges.

Another solution consists of providing for the door edges delimiting the window opening in the door 90 to be rectilinear, which does not nullify the advantages of the invention since, as has been explained above with respect to FIGS. 3 and 4, the only condition necessary for implementing the invention is that the parts that are moveable in relation to each other (here the door 90 and the bodywork 91) cooperate by means of undulating rabbets on two non-parallel sides, which condition is fulfilled by the curved edges 94 extending the rectilinear edges of the window opening downwards, and by the lower edge 95.

In the desire for strengthening, because of the seriousness of the risks involved, it is preferable not to be content with the theoretical minimum but rather to extend effectiveness as far as possible. Thus, whatever the solution adopted in order to resolve the problem set out above of the mobility of the window 92, it is advisable to provide the upper edge 96 of the door 90 with undulating rabbets, as shown.

Figure 20A:
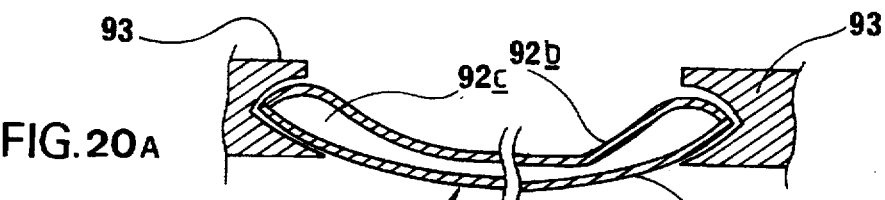
FIG. 20A is a partial diagrammatic view in section showing an example of a vehicle door window, having an internal space and in accordance with the invention.

FIG. 20A shows, in horizontal section, a vehicle door of the type shown in FIG. 19.

The window 92 is formed of an assembly conforming to the invention, that is, it comprises two shells 92a and 92b made of transparent material, suitably curved, joined by their peripheries and defining an internal space 92c.

The latter can be empty and the air it contains contributes to the thermal insulation of the vehicle.

It can also be filled with any desired fluid.

Figure 20B:
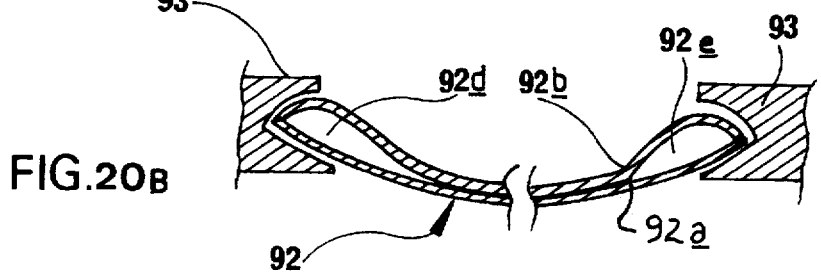
FIG. 20B is a partial diagrammatic view in section showing an example of a vehicle door window, having a central double-glazed portion and reinforcing rims.

FIG. 20B is a similar view to FIG. 20A but here the two shells 92a and 92b are applied against each other in their central part, to create double glazing that does not modify the characteristics of visibility by transparency.

The two shells 92a and 92b determine hollow lateral ribs (here without any filling material), 92d and 92e constituting reinforcements capable of withstanding stresses such as impacts or intense vibrations at the time of a collision.

It will be observed that the lower 95 and upper 96 "horizontal" edges are located respectively near the lower part of the bodywork known as the "sill" 97 and near the roof 98. These bodywork elements, particularly the sill 97, can be particularly strong and rigid, even reinforced, so that the fitting together of the rabbets on the sides 94 is extremely sturdy and gives the door 90 a resistance to impact of a value unknown heretofore.

The invention applied to vehicles is naturally highly recommended for very exposed vehicles: heavy goods vehicles, racing cars, all-terrain vehicles, military and police vehicles, etc.

As has been seen above, the effectiveness of the coupling of the moveable parts by means of rabbets with undulating profile is such that the mechanical elements by which the moveable elements are held in a closed position can be simplified, since they no longer have to take sideways efforts (which are taken up by the convex/ concave undulations).

This effectiveness makes it possible to produce containers intended for sensitive, fragile, delicate or very costly objects and materials.

By way of example, we can mention musical instruments, particularly stringed instruments such as violins.

Such containers can be given all sorts of internal fittings: cells, wedges, holding elements, etc., whether added on or moulded together with the body and/or the lid.

There are also cases where an extremely strong closure has to be provided because of a serious risk of forcible opening.

This is the case with the doors of certain types of premises, the doors of strongrooms, etc.

The very design of the invention makes it possible to produce such doors with exceptional strength and security in use.

Figure 21:
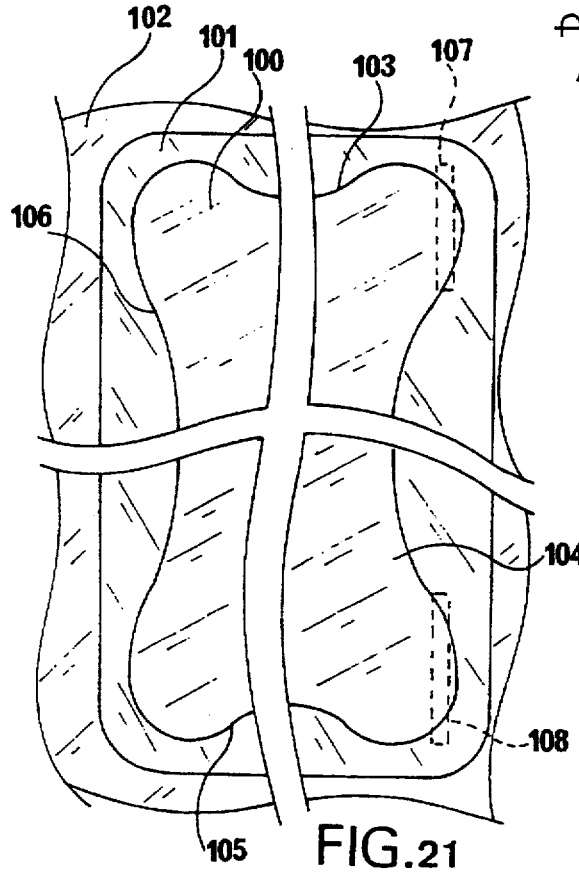
FIG. 21 is a diagrammatic front view of a door in accordance with the invention, in which the leaf in the closed position is flush with the frame.

FIG. 21 shows diagrammatically a door with a leaf 100 and a frame 101 secured to a wall 102. The leaf 100 cooperates with the frame 101 by rabbets with undulating profile 103, 104, 105 and 106 on each of the four sides of the door, which rabbets are of the same type as those in FIGS. 18 and 19, that is, flush-fitting rather than edge-to-edge.

The leaf 100 is mounted so as to pivot relative to the frame 101 by means of hinges 107 and 108 of any known type.

This nested structure offers great complications to any forcible opening which might be attempted by hostile persons using levers inserted between leaf and frame.

Indeed, any effort exerted on one of the four sides having even a slight result, in the direction parallel to the plane of the leaf 1 00, has the consequence of the rabbets on the other three sides bracing each other.

In order to manage to move the leaf 100 relative to the frame 101, it would be necessary to exert an effort of extraction of all four sides at once, and also to have an adequate fulcrum. that is, a good purchase on the rabbets, but the skilled person knows how to minimise this risk.

The simplest method of forcible opening is obviously to manoeuvre the lock that is normally found on the doors.

Figure 22:
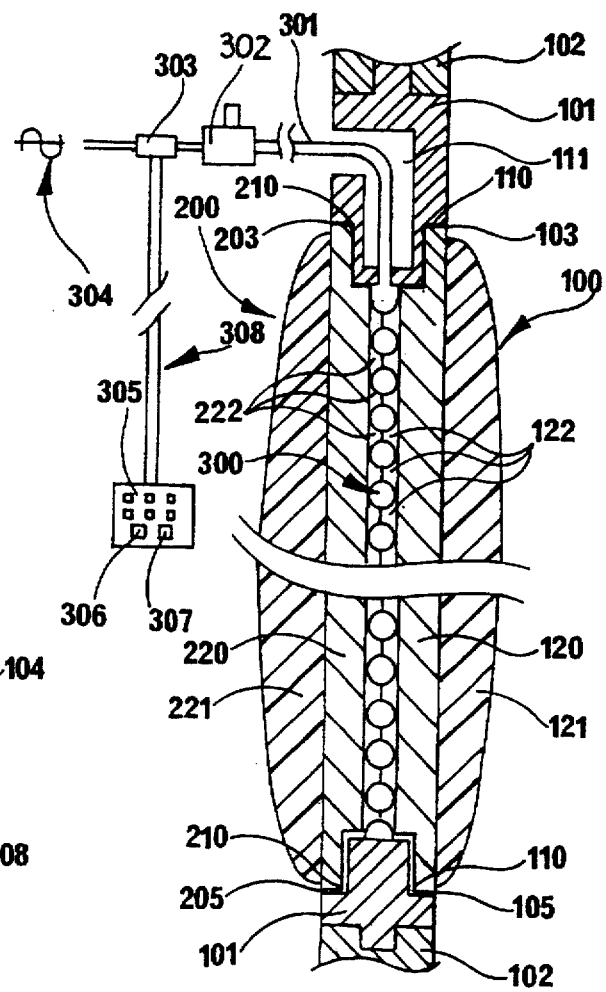
FIG. 22 is a diagrammatic view in section of a door in accordance with the invention, having two opposite leaves which, in the closed position, are flush with the frame and are held in this position by a partial vacuum.

According to the invention, the need for any lock is eliminated by using, to hold the leaf 100 secure, the very powerful force of a partial vacuum, which is illustrated by the diagram in FIG. 22.

The whole door has two leaves 100 and 200, located on either side of the same frame 101 so as to define a median space 300.

The leaf 200 is identical to the leaf 100 and also has four rabbets, of which only the upper rabbet 203 and the lower rabbet 205 are visible in the drawing.

Along the rabbets there are two continuous resilient seals 110 for the leaf 100 and 210 for the leaf 200, so as to produce a good seal between the frame 101 and the leaves 100 and 200 when they are in the closed position, which is that shown in FIG. 22.

The frame 101 has a passage 111 that communicates with the median space 300 and receives a conduit 301 connected to a vacuum pump 302 associated with a control and supply box 303, containing electric and electronic circuits and components, and connected to a source of current 304.

The box 303 is connected to a control device 305 made here in the form of an alpha-numerical keyboard permitting the use of a confidential code.

The operation of this door is as follows: when the leaves 100 and 200 are in the closed position, the entering of the correct code on the keyboard 305 actuates a button 306 (marked "CLOSE") that closes the supply circuit to the vacuum pump 302, which draws out the air contained in the space 300, and this tends to bring together the leaves 100 and 200 and to compress the seals 110 and 210. This force holds the leaves 100 and 200 all more energetically as the vacuum becomes more intense, which depends both on the degree of sealing provided by the seals 110 and 210, and the performance of the pump 302.

To open the door, the correct code has to be entered on the keyboard 305 to actuate a button 307 (marked "OPEN") that closes the supply circuit to a solenoid valve (not shown) which places the conduit 301, and therefore the space 300, under atmospheric pressure.

The leaves 100 and 200 are then released and can be put in the open position.

To do this, at least one grasping element should be provided but this constitutes a vulnerable point that is better eliminated.

Provision is then made for the control box 303 to be capable of controlling the operation of the pump 302 either for suction or for delivery.

Operating the button 306 causes suction and the holding tight of the leaves 100 and 200 in the closed position, while operating the button 307 causes first the elimination of the partial vacuum then an intake of compressed air that acts as a motor to move the leaves 100 and 200 away from the frame 101 and thus brings them into the open position.

Of course, it would be possible fraudulently to release the leaves 100 and 200 in the closed position not by using powerful mechanical means but simply by creating a leak in the conduit 301 and/or the space 300.

To prevent this, the structure must be strong and provided with all means known to the person skilled in the art in order to protect the sensitive elements and make them inaccessible.

Apart from the conduit 301, the pump 302 and the control box 303, it would be advantageous to eliminate the electric wires 308 that have been shown here for connecting the box 303 and the keyboard 305, and to replace them with a radio link.

The leaves themselves can be particularly resistant to drilling, particularly by combining concrete and steel, in a known way.

Here, a simpler version has been shown: the leaves 100 and 200 comprise an inner part made of metal, respectively 120 and 220, and an outer shell made of synthetic material 121 and 221, appropriately secured.

To reduce as far as possible the amount of air to be drawn out and introduced, the space 300 is occupied, when the leaves 100 and 200 are in the closed position, by struts 122 and 222 respectively, fastened to the inner faces of the leaves 100 and 200.

When placed facing each other, they create a honeycomb-type structure and the total volume of the struts 122 and 222 is chosen so as to obtain the desired volume of void.

Since, when air is drawn out, the leaves 100 and 200 move towards each other, compressing the seals 110 and 210, it is necessary for the struts 122 and 222 to be separated from one another by a distance equal to that over which the leaves 100 and 200 move together if they are rigid.

If they are resilient, they can be in contact with each other as soon as the leaves 100 and 200 are closed, since they can yield to the effort of compression arising from the leaves 100 and 200.

In the latter case, they help to release the leaves 100 and 200 since they resume their initial shape and are pushed back as soon as the space 300 reverts to a lesser partial vacuum or to atmospheric pressure.

Naturally, the structure that has just been described can be associated with any control and monitoring means differing from the one described, particularly by providing a portable keyboard in radio connection with the control box 303, which can be in a location remote from the door and very well protected.

Figure 23:
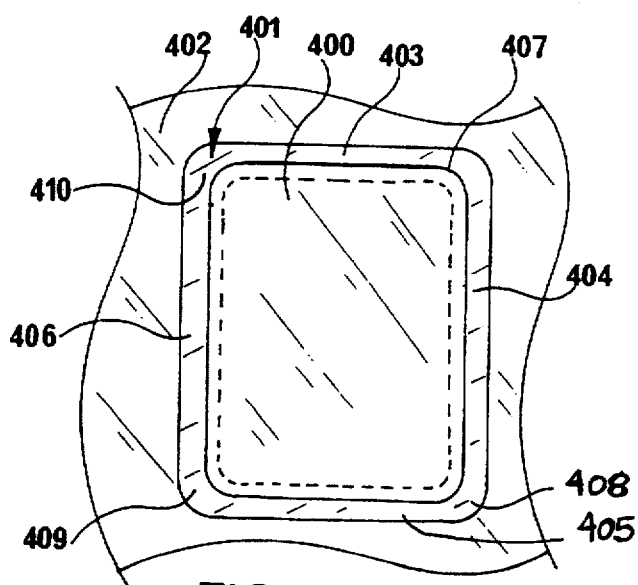
FIGS. 23 and 24 are diagrammatic views, from the front and in section respectively, of a specific embodiment of the invention.
Figure 24:
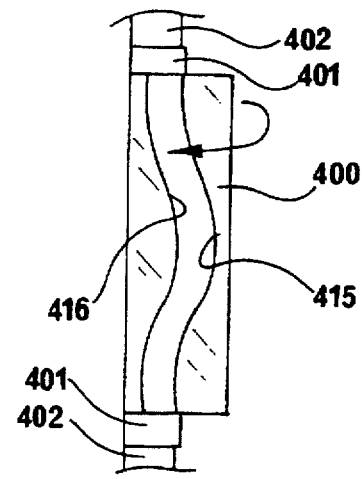

FIGS. 23 and 24 show an embodiment of the invention that makes it possible to produce a structure comprising two distinct parts that fit together when they cooperate but which have, externally, a contour with a line independent of the undulating profile of the rabbets.

Here, a leaf 400 has to cooperate with a frame 401 secured to a wall 402.

The leaf 400 and the frame 401 have a rectangular periphery, the sides of which 403, 404, 405 and 406 are rectilinear and are connected together by rounded corners 407, 408, 409 and 410.

Therefore, when the leaf 400 and the frame 401 are seen in plan, as in FIG. 21, no rabbet is apparent.

When the leaf 400 and the frame 401 are observed from the side, in the fully or partly opened position (the case of FIG. 24), it can be seen that the leaf 400 has peripheral rabbets 415 with an undulating profile, comparable to that in FIGS. 2 to 14, but provided inside the rectangular contour. Of course, the frame 401 has complementary rabbets 416 so that, in the closed position, the rabbets 415 and 416 interpenetrate as already explained.

This embodiment makes it possible to combine the advantages of rabbets with an undulating profile and rectilinear outer forms.

In particular, it can be adopted for vehicles, in which it does not change the external appearance.

Since the invention applies equally well to the case where two distinct parts have to be joined without them being moveable, the invention can be applied to the production of the glass parts that close off the portholes of aircraft cabins, since they have to be fastened extremely securely in order to resist the constraints of deformation of the cell.

After the glass parts are positioned and fastened, particularly by bonding, the efforts to which they are subjected parallel to their plane are taken by the rabbets with an undulating profile, as described in relation to FIG. 18.

FIGS. 25 and 26 illustrate an example embodiment of a suitcase of known type in which castors, which can if necessary be obscured, and a grasping handle allow the suitcase to be towed.

Suitcases of this type prove to be relatively impractical because of their instability, whatever variant is adopted: four castors under the suitcase that give it the structure of a trolley, two castors near one end, removable cradle, etc.

The result remains mediocre even if the suitcase is arranged in a more stable orientation: flat.

This is due to the fact that, since suitcases always have substantially the shape of a parallelepiped, their center of gravity is always close to their geometrical center while the elements that allow them to be wheeled and towed manually are specifically placed as far as possible from this centre: the castors are obviously placed at the lowest point and the handle at the highest point.

Consequently, these suitcases are always in an unstable equilibrium.

The present invention solves this particular problem by significantly lowering the center of gravity.

Indeed, the invention makes it possible to produce an assembly, in this case a suitcase 500, that is shaped substantially as a roller, comprising two curved shells 501 and 502, the first constituting the body of the suitcase and the second its lid.

The structure of the rabbets, which have been shown by a joining line 503, will not be described once again.

Since the shell or body 501 is intended to be placed flat frequently, when the suitcase is in normal use, that is, when it is being packed and unpacked, the outer face of the body 501 must be curved very little so the suitcase has the stability essential to it.

The shell 502 can be a little more curved so as to have a convex outer face, shaped like a dome with a very flat curve, with the aim of combining two effects:

a vault effect giving the suitcase great sturdiness through its resistance to crushing, a stability effect allowing the suitcase to be stacked in a stable manner.

When the suitcase is seen from the front (FIG. 25) it has a substantially rectangular contour, that is, rectangular and each of the vertices of this polygon, both for the body 501 and for the lid 502, itself has a convex curvature, providing a perfect connection between the large faces of the suitcase and its lateral faces and also playing the role of a vault.

This assembly therefore has the general form of a roller, without any sharp angle, and offers a significant resistance to impacts and other external stresses, in all directions.

Since the shells 501 and 502 are moulded, it is possible to make them asymmetrical not only by considering them according to the height H of the suitcase, but also according to its length L and its width I.

It may be seen, for instance, that the lower part (in the drawing) of the suitcase is distinctly more bulging than the upper part, which is thinner.

FIG. 25 shows that the maximum width I is much nearer the bottom than the top, at the place where the maximum height H is also located, more or less (FIG. 26).

While the maximum width I and the maximum height H are shifted downwards, the maximum length L is, in contrast, perfectly centred so as to avoid any lateral imbalance.

Castors 504 (which may be obscured by any known means) are therefore provided under this bulging part of the suitcase and a grasping handle 505 (which may also be obscured by any known means) is provided on the opposite side, which is the thinner part.

It is obviously the lower part of the suitcase that is the heaviest and we can see that the centre of gravity CG is both in the vertical axis of the suitcase and distinctly below its median part.

A suitcase made in this way can therefore, for the first time, be towed along in stable equilibrium, the overturning moment becoming very great and hence improbable.

FIG. 27 shows a variant embodiment in which the body 601 of a container such as a suitcase (not shown in full) has sliding runners 602 and 603 on the outside.

Since the body 601 is shown in section in the left-hand part of the figure, it can be seen that the runners 602 and 603 can be produced by moulding in a piece with the body 601 and that they can be given very gently curving shapes, eliminating any abrupt part that might constitute an obstacle to the displacement of the container by sliding over the ground.

The invention makes it possible to produce not only articles of luggage and containers of relatively large dimensions but also small cases containing fragile objects: spectacle cases, cases for delicate instruments, etc.

I claim:

1. An assembly comprising:

a first polygonal part and a second polygonal part, the first and second parts being engaged against each other in a closed position for the assembly;

the first and second parts each having at least two non-parallel sides connected to each other at a corner and extending at an angle to each other, each side having a rabbet edge and the rabbet edges of said first part being shaped to closely engage the rabbet edges of said second part in the closed position;

the edges of each side having a gently undulating profile with at least one arc on each side, one of said parts having convex arcs which correspond to, and closely engage concave arcs of the other of said parts; and the corners being rounded and one of the concave arcs of one of the parts extending around the corner thereof and being closely engaged by one of the convex arcs of the other of said parts which extends around the corner of the other of said parts.

2. An assembly according to claim 1, wherein each arc has a deflection (FL) of a length less than a chord (CO) of the arc.

3. An assembly according to claim 2, wherein the deflection (FL) has a length of between ¹⁄₁₀₀ and ¼ of the length of the corresponding chord (CO).

4. An assembly according to claim 3, wherein the assembly has a length L, a width I and a height H, the deflection (FL) of the arc of the curves is of the order of magnitude of ⅔ of H.

5. An assembly according to claim 1, wherein flexible seal is secured to one of the rabbets facing the opposite rabbet.

6. An assembly according to claim 1, wherein at least the two parts are joined together inseparably.

7. An assembly according to claim 6, wherein the parts are shells that each define an internal concave space.

8. An assembly according to claim 7, wherein the internal space contains a filling material.

9. An assembly according to claim 1, wherein the two parts are asymmetrical.

10. An assembly according to claim 1, wherein the rabbets are variable in width.

11. An assembly according to claim 10, wherein the assembly has a polygonal contour, a greatest width of the rabbets being in the vicinity of one of the vertices of the polygon and in the central zone of its sides.

12. An assembly according to claim 1, wherein at least one of the parts is made of a material that is variable in thickness.

13. An assembly according to claim 1, wherein at least one of the parts has reinforcing ribs.

14. An assembly according to claim 1, wherein the reinforcing ribs are hollow.

15. An assembly according to claim 1, wherein the reinforcing ribs contain a filling material.

16. An assembly according to claim 1, wherein the first and second parts are connected to each other for movement between the closed position and an open position with the edges of the first and second parts being spaced away from each other.

17. An assembly according to claim 16, wherein the parts are quadrangular.

18. An assembly according to claim 17, wherein the parts have rabbets on all four sides.

19. An assembly according to claim 16, wherein the parts are hinged together along an axis of pivoting.

20. An assembly according to claim 19, wherein the axis of pivoting is close to one of the sides of the parts.

21. An assembly according to claim 16, wherein the moveable parts cooperate edge to edge, portions shaped as the convex and concave arc being located in a line substantially perpendicular to a plane of the moveable parts.

22. An assembly according to claim 16, the moveable parts are located, in the closed position, in planes that are substantially an extension of one another, such that the edges are themselves in the extension of said moveable parts and the portions shaped as a convex and concave arc in the extension of said edges.

23. An assembly according to claim 16, wherein the rabbets have rims that are offset in twos and are positioned against one another when the two parts are in the closed position.

24. An assembly according to claim 16, including means intended to make a tight closure of the two parts, at right angles to the rabbets, said rabbets delimiting a space located between the two parts when they are in the closed position, the means including an air suction device.

25. An assembly according to claim 16, wherein at least one of the parts has a convex outer face, in the shape of a dome with a very flat curve forming a vault.

26. An assembly according to claim 25, the part that has a convex outer face, in the shape of a dome with a very flat curve, has a polygonal contour, each vertex of the polygon being itself curved and convex, being connected to lateral faces that are substantially orthogonal to the convex outer face.

27. An assembly according to claim 26, wherein each vertex of the polygon is a fraction of a sphere.

28. An assembly according to claim 16, wherein the assembly is a container and has, externally, sliding elements.

29. An assembly according to claim 16 wherein each arc has a deflection (FL) and a chord length (CO), the deflection being about $1/100$–$1/4$ of the chord length.

30. An assembly according to claim 29 wherein the deflection is about $2/3$ of a height of the assembly.

31. An assembly according to claim 1 wherein the first and second parts comprise first and second lids for a container which are engaged against each other for closing the container, the outer surfaces of the first and second lids being smoothly curved and continuous with each other around the perimeter of the container.

32. An assembly according to claim 31 wherein one of the non-parallel sides of each of the first and second lids has a different length than the other of the non-parallel sides for each of the first and second lids, one of the sides being the smaller side and the other being the longer side.

33. An assembly according to claim 1 wherein the first and second parts comprise first and second parts for a container which are engaged against each other for closing the container, the outer surfaces of the first and second parts being smoothly curved and continuous with each other around the perimeter of the container.

34. An assembly according to claim 33 wherein the first and second parts each have four sides and four corners, all of the corners being rounded and each of the sides of one of the parts containing only a single concave undulation with each of the sides of the other of said parts having a single convex undulation closely engaged with the single concave undulation of respective sides of said one of said parts.

* * * * *